United States Patent
Wu (10) Patent No.: US 9,792,623 B2
(45) Date of Patent: Oct. 17, 2017

(54) ADVERTISEMENT PROCESSING METHOD AND APPARATUS

(71) Applicant: Huawei Technologies Co., Ltd., Shenzhen, Guangdong (CN)

(72) Inventor: Minghui Wu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 14/584,915

(22) Filed: Dec. 29, 2014

(65) Prior Publication Data

US 2015/0112798 A1 Apr. 23, 2015

Related U.S. Application Data

(63) Continuation of application No. PCT/CN2014/083787, filed on Aug. 6, 2014.

(30) Foreign Application Priority Data

Aug. 26, 2013 (CN) .......................... 2013 1 0375711

(51) Int. Cl.
*G06Q 30/02* (2012.01)
*H04L 29/08* (2006.01)
(Continued)

(52) U.S. Cl.
CPC ..... *G06Q 30/0251* (2013.01); *G06F 9/44526* (2013.01); *H04L 67/10* (2013.01);
(Continued)

(58) Field of Classification Search
CPC . G06F 9/45526; G06F 9/455; G06Q 30/0251; H04L 67/303; H04L 67/34; H04W 4/003; H04W 4/206; H04W 28/24
(Continued)

(56) References Cited

U.S. PATENT DOCUMENTS 7,712,141 B1 * 5/2010 Agrawal ................ G06Q 30/02
 713/168
2001/0054001 A1 * 12/2001 Robinson ............... G06Q 30/02
 705/14.53

(Continued)

FOREIGN PATENT DOCUMENTS

CN 001759388 A 4/2006
CN 001926893 A 3/2007
(Continued)

*Primary Examiner* — Alina N Boutah (57) ABSTRACT

Embodiments of the present invention provide an AD processing method and apparatus. The method includes: acquiring, by a terminal, system information and/or current access network information of the terminal; sending, by the terminal to a plugin server, an AD plugin request message that includes the system information and/or the current access network information of the terminal, so that the plugin server acquires, according to the system information and/or the current access network information, AD plugin information that matches the terminal; and receiving, by the terminal, the AD plugin information that is sent by the plugin server and matches the terminal, and choosing to download an AD plugin according to the AD plugin information. In the embodiments, it is implemented that traffic and time are saved for a user, and expenses may further be reduced for the user.

9 Claims, 5 Drawing Sheets

(51) Int. Cl.
*H04W 4/00* (2009.01)
*H04W 4/20* (2009.01)
*G06F 9/445* (2006.01)

(52) U.S. Cl.
CPC ............ *H04L 67/303* (2013.01); *H04L 67/34* (2013.01); *H04W 4/003* (2013.01); *H04W 4/206* (2013.01)

(58) Field of Classification Search
USPC ........................................ 705/14.49; 709/203
See application file for complete search history.

(56) References Cited

U.S. PATENT DOCUMENTS

| | | | | |
|---|---|---|---|---|
| 2006/0212347 A1* | 9/2006 | Fang | ...................... | G06Q 30/02 705/14.61 |
| 2007/0130012 A1 | 6/2007 | Yruski et al. | | |
| 2008/0201748 A1 | 8/2008 | Hasek et al. | | |
| 2008/0255686 A1* | 10/2008 | Irvin | ...................... | G06Q 30/02 700/94 |
| 2009/0222510 A1* | 9/2009 | van Riel | ................ | G06Q 30/02 709/203 |
| 2010/0088170 A1* | 4/2010 | Glore, Jr. | ................ | G06Q 10/00 705/14.19 |
| 2010/0191599 A1* | 7/2010 | Vaidyanathan | .... | G06Q 30/0251 705/14.49 |
| 2011/0173069 A1* | 7/2011 | Fein | ....................... | G06Q 30/02 705/14.53 |
| 2011/0185015 A1* | 7/2011 | Stolper | ................... | G06Q 30/02 709/203 |
| 2011/0238495 A1* | 9/2011 | Kang | ..................... | G06Q 30/02 705/14.49 |
| 2012/0054777 A1* | 3/2012 | Xiques | ............... | G06Q 30/0277 719/318 |
| 2013/0305276 A1* | 11/2013 | Barhate | ................ | H04N 21/812 725/32 |
| 2013/0317919 A1* | 11/2013 | Raman | ................. | H04N 19/197 705/14.73 |
| 2014/0046739 A1* | 2/2014 | Gaither | .................. | G06Q 30/02 705/14.4 |
| 2014/0330559 A1* | 11/2014 | Higbie | .................... | G10L 15/26 704/235 |
| 2015/0193821 A1 | 7/2015 | Izumori et al. | | |

FOREIGN PATENT DOCUMENTS

| | | |
|---|---|---|
| CN | 101420670 A | 4/2009 |
| CN | 101540768 A | 9/2009 |
| CN | 101877721 A | 11/2010 |
| CN | 103458397 A | 12/2013 |
| JP | 2002091995 A | 3/2002 |
| JP | 2006268274 A | 10/2006 |
| JP | 2012-137857 A | 7/2012 |
| JP | 5235251 B1 | 4/2013 |
| WO | WO 2007/123783 A2 | 11/2007 |

* cited by examiner

ADVERTISEMENT PROCESSING METHOD AND APPARATUS

CROSS-REFERENCE TO RELATED APPLICATIONS

This application is a continuation of International Application No. PCT/CN2014/083787, filed on Aug. 6, 2014, which claims priority to Chinese Patent Application No. 201310375711.2, filed on Aug. 26, 2013, both of which are hereby incorporated by reference in their entireties.

TECHNICAL FIELD

The present invention relates to communications technologies, and in particular, to an advertisement processing method and apparatus.

BACKGROUND

If a mobile phone application developer wants an application to receive an advertisement (AD), a software development kit (SDK) provided by an AD platform generally needs to be implanted to request an AD.

In the prior art, a process of delivering an AD to an application (app) on a terminal is as follows: When an app is started, a mini (mini) SDK is loaded to system memory, where the mini SDK may be integrated into the app; the mini SDK requests an AD plugin (Plugin) from an AD server (Server); then when the foregoing terminal runs the app for the first time, the mini SDK downloads all AD plugins related to the app, and when downloading is completed, the mini SDK loads these AD plugins; after that, the mini SDK requests an AD from the AD server, the AD server sends the AD to the mini SDK, and the mini SDK displays the AD to a user by using a display device of the terminal; and if the user has an operation, for example, browsing or clicking the AD, an operation event of the user is reported to the AD server, so that the AD server performs accounting.

However, by using the prior art, when running the app for the first time, the terminal needs to consume a large amount of network traffic and time to download all AD plugins related to the app, which causes a waste of traffic and time.

SUMMARY

Embodiments of the present invention provide an AD processing method and apparatus, which are used to resolve a problem that a terminal consumes a large amount of network traffic and time to download all AD plugins.

A first aspect of the embodiments of the present invention provides an advertisement (AD) processing method, where the method includes:

acquiring, by a terminal, system information and/or current access network information of the terminal;

sending, by the terminal to a plugin server, an AD plugin request message that includes the system information and/or the current access network information of the terminal, so that the plugin server acquires, according to the system information and/or the current access network information, AD plugin information that matches the terminal; and receiving, by the terminal, the AD plugin information that is sent by the plugin server and matches the terminal, and choosing to download an AD plugin according to the AD plugin information.

With reference to the first aspect, in a first possible implementation manner of the first aspect, the choosing to download an AD plugin according to the AD plugin information includes:

determining, by the terminal, an undownloaded target AD plugin according to the AD plugin information; and sending, by the terminal to the plugin server, a download request message for downloading the target AD plugin, so as to download the target AD plugin.

With reference to the first possible implementation manner of the first aspect, in a second possible implementation manner of the first aspect, after the downloading, by the terminal, the target AD plugin, the method further includes:

acquiring, by the terminal, updated current access network information of the terminal; and sending, by the terminal, an AD request message to an AD server, so that the AD server delivers, to the terminal, an AD that matches the terminal, where the AD request message includes any one or combination of the following: an identifier of the AD plugin currently downloaded by the terminal, the system information, and the updated current access network information of the terminal.

With reference to any one of the first aspect to the second possible implementation manner of the first aspect, in a third possible implementation manner of the first aspect, the system information includes any one of the following: central processing unit information of the terminal, type information of a supported network, screen size information, resolution information, memory information, and operating system version information.

A second aspect of the embodiments of the present invention provides an advertisement (AD) processing method, where the method includes:

receiving, by a plugin server, an AD plugin request message that is sent by a terminal and includes system information and/or current access network information of the terminal; and acquiring, by the plugin server according to the system information and/or the current access network information, AD plugin information that matches the terminal, and sending the AD plugin information to the terminal, so that the terminal chooses to download an AD plugin according to the AD plugin information.

With reference to the second aspect, in a first possible implementation manner of the second aspect, after the sending the AD plugin information to the terminal, the method further includes:

receiving, by the plugin server, a download request message that is sent by the terminal and is for downloading an AD plugin.

With reference to the second aspect, in a second possible implementation manner of the second aspect, the system information includes any one or combination of the following: central processing unit information of the terminal, type information of a supported network, screen size information, resolution information, memory information, and operating system version information.

A third aspect of the embodiments of the present invention provides an advertisement (AD) processing method, where the method includes:

receiving, by an AD server, an AD request message sent by a terminal, where the AD request message includes any one or combination of the following: an identifier of an AD plugin currently downloaded by the terminal, system information of the terminal, and current access network information of the terminal; and sending, by the AD server and to the terminal according to the AD request message, an AD that matches the terminal.

With reference to the third aspect, in a first possible implementation manner of the third aspect, the system information includes any one or combination of the following: central processing unit information of the terminal, type information of a supported network, screen size information, resolution information, memory information, and operating system version information.

A fourth aspect of the embodiments of the present invention provides an advertisement (AD) processing apparatus, where the apparatus includes:

an acquiring module, configured to acquire system information and/or current access network information of a terminal;

a sending module, configured to send, to a plugin server, an AD plugin request message that includes the system information and/or the current access network information, so that the plugin server acquires, according to the system information and/or the current access network information, AD plugin information that matches the terminal; and a downloading module, configured to receive the matching AD plugin information that is sent by the plugin server, and choose to download an AD plugin according to the AD plugin information.

With reference to the fourth aspect, in a first possible implementation manner of the fourth aspect, the downloading module is specifically configured to determine, according to the AD plugin information, an undownloaded target AD plugin; and send, to the plugin server, a download request message for downloading the target AD plugin, so as to download the target AD plugin.

With reference to the first possible implementation manner of the fourth aspect, in a second possible implementation manner of the fourth aspect, the acquiring module is further configured to acquire updated current access network information of the terminal; and the sending module is further configured to send an AD request message to an AD server, so that the AD server delivers, to the terminal, an AD that matches the terminal, where the AD request message includes any one or combination of the following: an identifier of the AD plugin currently downloaded by the terminal, the system information, and the updated current access network information of the terminal.

With reference to anyone of the fourth aspect to the second possible implementation manner of the fourth aspect, in a third possible implementation manner of the fourth aspect, the system information includes any one or combination of the following: central processing unit information of the terminal, type information of a supported network, screen size information, resolution information, memory information, and operating system version information.

A fifth aspect of the embodiments of the present invention provides an advertisement (AD) processing apparatus, where the apparatus includes:

a receiving module, configured to receive an AD plugin request message that is sent by a terminal and includes system information and/or current access network information of the terminal; and a sending module, configured to acquire, according to the system information and/or the current access network information, an AD plugin list that matches the terminal; and send the AD plugin list to the terminal, so that the terminal chooses to download an AD plugin according to the AD plugin list.

With reference to the fifth aspect, in a first possible implementation manner of the fifth aspect, the receiving module is further configured to receive a download request message that is sent by the terminal and is for downloading an AD plugin.

With reference to the fifth aspect, in a second possible implementation manner of the fifth aspect, the system information includes anyone or combination of the following: central processing unit information of the terminal, type information of a supported network, screen size information, resolution information, memory information, and operating system version information.

A sixth aspect of the embodiments of the present invention provides an advertisement (AD) processing apparatus, where the apparatus includes:

a receiving module, configured to receive an AD request message sent by a terminal, where the AD request message includes anyone or combination of the following: an identifier of an AD plugin currently downloaded by the terminal, system information of the terminal, and current access network information of the terminal; and a sending module, configured to send, to the terminal according to the AD request message, an AD that matches the terminal.

With reference to the sixth aspect, in a first possible implementation manner of the sixth aspect, the system information includes any one or combination of the following: central processing unit information of the terminal, type information of a supported network, screen size information, resolution information, memory information, and operating system version information.

In the embodiments of the present invention, a terminal acquires local system information and/or current access network information, and notifies a plugin server of the system information and/or the current access network information, so that the plugin server may pick out, according to the system information and/or the current access network information, an AD plugin that matches the terminal. In this case, the terminal may download an AD plugin according to an actual situation, and a redundant AD plugin may not be downloaded to avoid a waste of traffic and time. That is, it is implemented that traffic and time are saved for a user, and expenses may further be reduced for the user.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
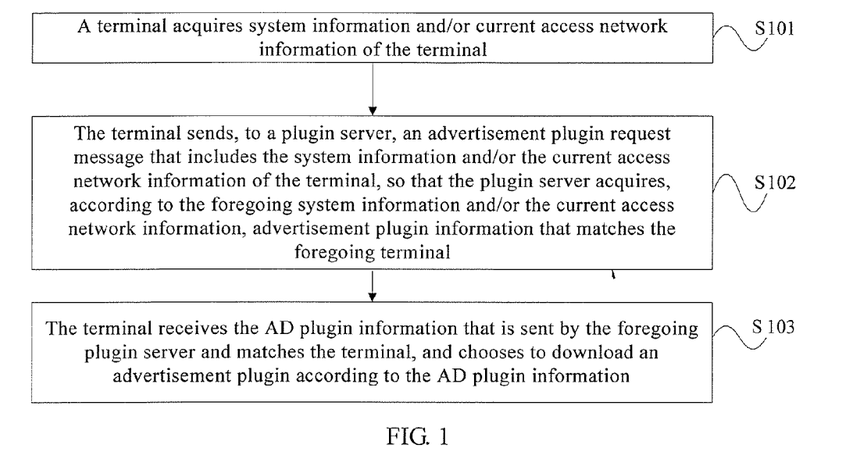
FIG. 1 is a schematic flowchart of an AD processing method according to Embodiment 1 of the present invention.

FIG. 1 is a schematic flowchart of an AD processing method according to Embodiment 1 of the present invention. As shown in FIG. 1, the method includes:

S101: A terminal acquires system information and/or current access network information of the terminal.

Specifically, it may be that an app installed on the terminal acquires the system information and/or the current access network information of the terminal. The foregoing terminal may be a device, such as a mobile phone or a tablet computer. More specifically, acquiring may be performed by a mini SDK on a client.

The system information may include any one or combination of the following: central processing unit (CPU) information of the terminal, type information of a supported network, screen size information, resolution information, memory information, operating system information, and the like. It should be noted that the CPU information mainly refers to frequency information of a CPU of the terminal; the type information of a supported network mainly refers to information about a network that may be used by the terminal, for example, using a wireless local area network (WLAN), and/or a third generation (3G) of mobile telecommunications technology network, and/or a Global System for Mobile Communications (Global System for Mobile Communications, GSM for short) network. The current access network information is information used to notify a plugin server of a type of a network that the terminal currently accesses. The operating system version information is information used to notify whether an operating system is an Android (Android) system, a Symbian system or another system, and information about a version of the system. For example, operating system version information that identifies a mobile phone is Android 4.1.2.

S102: The terminal sends, to a plugin server, an AD plugin request message that includes the system information and/or the current access network information of the terminal, so that the plugin server acquires, according to the foregoing system information and/or the current access network information, AD plugin information that matches the foregoing terminal. The AD plugin information that matches the foregoing terminal may be indicated in a form of a list, where the list includes a name, a version number, and a downloading address of each AD plugin that matches the foregoing terminal, a digest of the AD plugin, and the like. The digest of the AD plugin may be the Message Digest Algorithm 5 (MD5), that is, a string of characters.

There are multiple AD plugins that are related to one terminal, for example, a video playback function plugin, a flash playback function plugin, and a location capability plugin. However, for terminals with different performance, it is not necessary to download all related AD plugins, which not only wastes traffic but also wastes memory. For example, a mobile phone does not have a location function, an app on the mobile phone does not need to download a location capability plugin, because even if the location capability plugin is downloaded, an AD related to location cannot be acquired. For another example, by using the foregoing current access network information, it is determined that a network currently accessed by the foregoing terminal is a GSM network. Then, it is not recommended to download an AD plugin that consumes a relatively large amount of traffic. In this case, expenses may be reduced for a user. Therefore, the plugin server picks out a proper AD plugin for the terminal according to the system information and/or the current access network information of the terminal, and AD plugin information is generated and is sent to the terminal.

S103: The terminal receives the AD plugin information that is sent by the foregoing plugin server and matches the terminal, and chooses to download an AD plugin according to the AD plugin information.

In this embodiment, a terminal acquires local system information and/or current access network information, and notifies a plugin server of the system information and/or the current access network information, so that the plugin server may pick out, according to the system information and/or the current access network information, an AD plugin that matches the terminal. In this case, the terminal may download an AD plugin according to an actual situation, and a redundant AD plugin may not be downloaded to avoid a waste of traffic and time. That is, it is implemented that traffic and time are saved for a user, and expenses may further be reduced for the user.

Specifically, a process of choosing to download an AD plugin according to the AD plugin information is as follows: The terminal determines an undownloaded target AD plugin according to the foregoing AD plugin information, and then the terminal sends, to the plugin server, a download request message for downloading the foregoing target AD plugin, so as to download the target AD plugin. It should be noted that all AD plugins included in the foregoing AD plugin information are AD plugins that need to be downloaded by the terminal. However, some AD plugins may have been downloaded by the terminal before. Therefore, the foregoing undownloaded target AD plugin specifically refers to an AD plugin that is included in the AD plugin information and has not been downloaded by the terminal, or an AD plugin with earlier version has been downloaded before. If the AD plugin information includes the AD plugin with an updated version, the AD plugin with the updated version is downloaded for updating as a target AD plugin.

Further, after the foregoing terminal downloads the target AD plugin, the foregoing terminal acquires updated current access network information of the terminal, that is, current access network information of the terminal is acquired again. Because a network accessed by the terminal may encounter a change at any time, in order to ensure correctness of information, current access network information is acquired again before an AD is acquired. Then, the foregoing terminal sends an AD request message to an AD server, so that the AD server delivers, to the foregoing terminal, an AD that matches the terminal, where the AD request message includes any one or combination of the following: an identifier of the AD plugin currently downloaded by the terminal, the foregoing system information, and the updated current access network information of the terminal. On a basis of the foregoing embodiment, the AD server learns AD plugins that the terminal has downloaded, and further, may determine, according to these AD plugins, the system information of the terminal and/or a network that the terminal currently accesses, ADs that are delivered to the terminal. For example, a terminal has downloaded only a jpg format image function plugin, then the AD server does not sends an AD that includes rich media (RM) to the terminal, but delivers only a static image AD. In this case, traffic may be further saved, and in this case, a delivered AD better matches performance of the terminal. In addition, delivering an AD according to a type of a network accessed by the terminal is mainly to help the user to reduce expenses while user experience is ensured. For example, if the AD server knows that a network accessed by the terminal is a WLAN, an AD with a good experience effect is delivered to the terminal, for example, an AD that includes RM; if the AD server knows that the network accessed by the terminal is a GSM network, a static image AD that consumes a relatively small amount of traffic is sent to the terminal. In addition, a more proper AD may be selected and provided for the terminal according to the foregoing system information, such as resolution, a screen size, and an operating system version, to better match performance and a configuration of the terminal, thereby offering better user experience.

In this embodiment, a terminal acquires system information and/or current access network information of the terminal, and notifies a plugin server of the system information and/or the current access network information, so that the plugin server may pick out, according to the system information and/or the current access network information, an AD plugin that matches the terminal, and delivers AD plugin information to the terminal. In this case, the terminal may download an AD plugin according to an actual situation of the terminal, and a redundant AD plugin may not be downloaded to avoid a waste of traffic and time. Further, an AD that matches the terminal is acquired from an AD server according to an AD plugin currently downloaded by the terminal, the system information of the terminal, the current access network information of the terminal, and the like. In this case, it may be implemented that expenses are reduced for a user while user experience is ensured.

Figure 2:
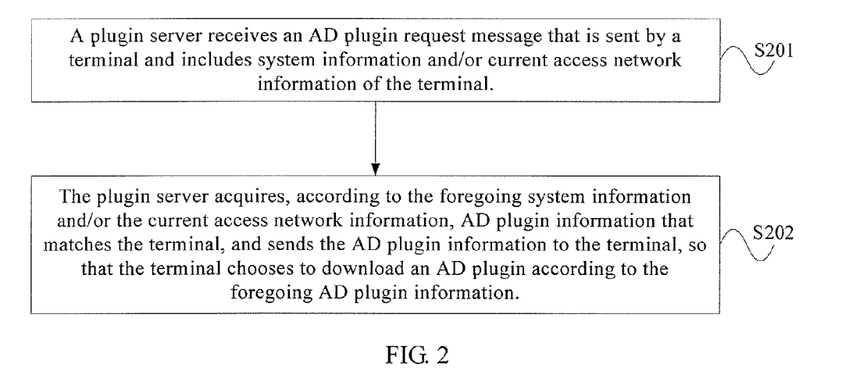
FIG. 2 is a schematic flowchart of an AD processing method according to Embodiment 2 of the present invention.

FIG. 2 is a schematic flowchart of an AD processing method according to Embodiment 2 of the present invention. On a basis of the foregoing embodiment, as shown in FIG. 2, the method includes:

S201: A plugin server receives an AD plugin request message that is sent by a terminal and includes system information and/or current access network information of the terminal. The system information includes any one or combination of the following: central processing unit information of the terminal, type information of a supported network, screen size information, resolution information, memory information, and operating system version information.

S202: The plugin server acquires, according to the foregoing system information and/or the current access network information, AD plugin information that matches the terminal, and sends the AD plugin information to the terminal, so that the terminal chooses to download an AD plugin according to the foregoing AD plugin information.

In this embodiment, a plugin server receives system information and/or current access network information that are/is sent by a terminal and of the terminal, and then acquires, according to the system information and/or the current access network information, AD plugin information that matches the terminal, so as to enable the terminal to perform downloading according to the AD plugin information. It is implemented that the terminal may download an AD plugin according to an actual situation of the terminal, and a redundant AD plugin may not be downloaded to avoid a waste of traffic and time.

Further, after the foregoing sending the AD plugin information to the terminal, the plugin server receives a download request message that is sent by the terminal and is for downloading an AD plugin. It should be noted that what the terminal requests for downloading is a target AD plugin that needs to be downloaded and that is picked out according to an actual situation and according to the AD plugin information.

Figure 3:
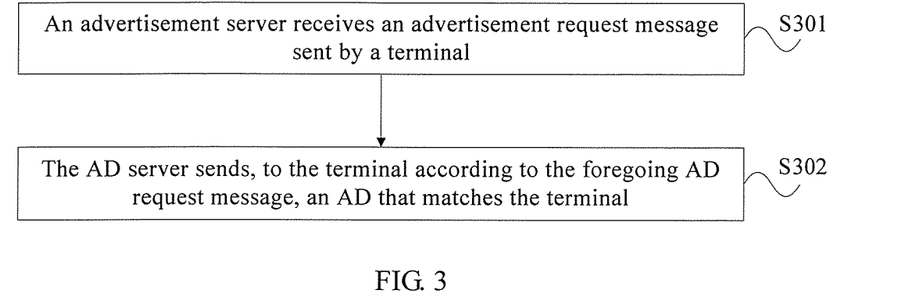
FIG. 3 is a schematic flowchart of an AD processing method according to Embodiment 3 of the present invention.

FIG. 3 is a schematic flowchart of an AD processing method according to Embodiment 3 of the present invention. On a basis of the foregoing embodiments, as shown in FIG. 3, the method includes:

S301: An AD server receives an AD request message sent by a terminal. The AD request message includes any one or combination of the following: an identifier of an AD plugin currently downloaded by the terminal, system information of a terminal, and current access network information of the terminal.

It should be noted that the system information includes any one or combination of the following: central processing unit information of the terminal, type information of a supported network, screen size information, resolution information, memory information, and operating system version information.

S302: The AD server sends, to the terminal according to the foregoing AD request message, an AD that matches the terminal.

For a specific implementation process, reference may be made to the foregoing embodiments, and details are not described herein again.

It should be noted that a request for delivering an AD plugin and a request for delivering an AD may be two independent processes, that is, after downloading of the AD plugin is completed, delivery of the AD may not be immediately requested.

In this embodiment, an AD server receives an identifier of an AD plugin currently downloaded by a terminal, and system information of the terminal, and/or current access network type information of the foregoing terminal that are sent by the terminal, and sends, to the terminal, an AD that matches the foregoing terminal, which may implement that expenses are reduced for a user while it is ensured that the user enjoys high-quality AD experience.

Figure 4:
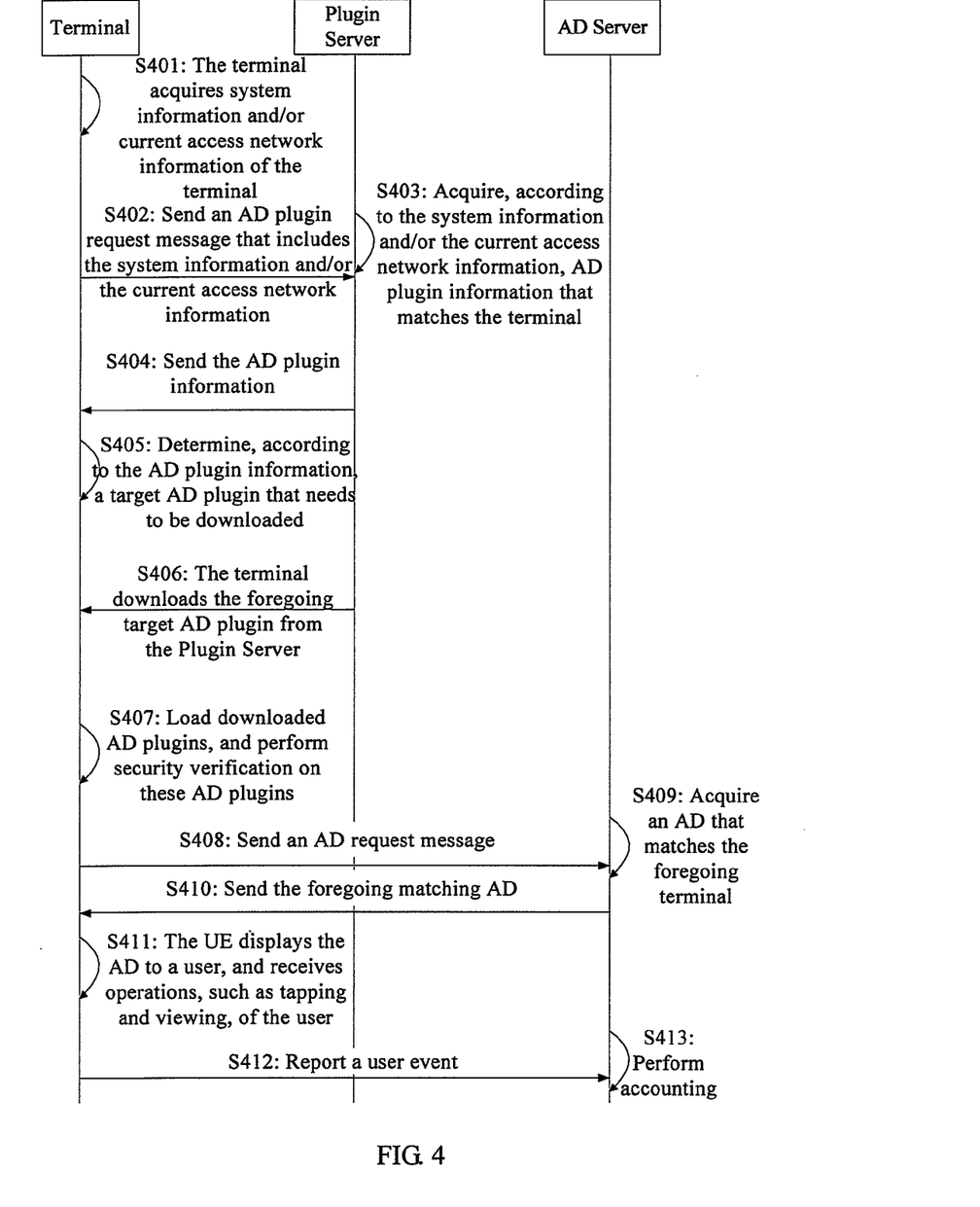
FIG. 4 is a schematic flowchart of an AD processing method according to Embodiment 4 of the present invention.

FIG. 4 is a schematic flowchart of an AD processing method according to Embodiment 4 of the present invention. On a basis of the foregoing embodiments, as shown in FIG. 4, a process of interactions between a terminal, an AD server, and a plugin server is as follows:

S401: The terminal acquires system information and/or current access network information of the terminal. Specifically, it may be that a client on the terminal initializes a mini SDK on the client, and acquiring is performed by the mini SDK.

S402: The terminal sends, to the plugin server, an AD plugin request message that includes the system information and/or the current access network information.

S403: The plugin server acquires, according to the system information and/or the current access network information, AD plugin information that matches the terminal.

S404: The plugin server sends the AD plugin information to the terminal.

S405: The terminal determines, according to the AD plugin information, a target AD plugin that needs to be downloaded. That is, an AD plugin that has not been downloaded before or that is required to be updated needs to be downloaded.

S406: The terminal downloads the foregoing target AD plugin from the plugin server.

S407: The terminal loads downloaded AD plugins, and performs security verification on these AD plugins. Specifically, the security verification may be determining whether an AD plugin digest (for example, MD5) is tampered with.

After execution of S401 to S407 is completed, downloading, updating, and loading of the AD plugin are completed. Further, delivery of an AD is completed by performing subsequent steps according to a requirement. Specifically, it may be after the terminal runs a specific client or multiple clients. Not all pages on a client have an AD. The terminal requests an AD only when a user uses a page that has embedded AD code.

S408: The terminal sends an AD request message to the AD server. The AD request message includes any one or combination of the following: an identifier of the AD plugin currently downloaded by the terminal, system information of the terminal, and the current access network information of the terminal.

S409: The AD server acquires an AD that matches the foregoing terminal.

S410: The AD server sends the foregoing matching AD to the terminal.

S411: The terminal displays the AD to a user, and receives operations, such as tapping and viewing, of the user.

S412: The terminal reports a user event to the AD server. That is, an operation of the user is reported to the AD server. For example, the user views the AD, enters a link in the AD, or the like.

S413: The AD server performs accounting.

Figure 5:
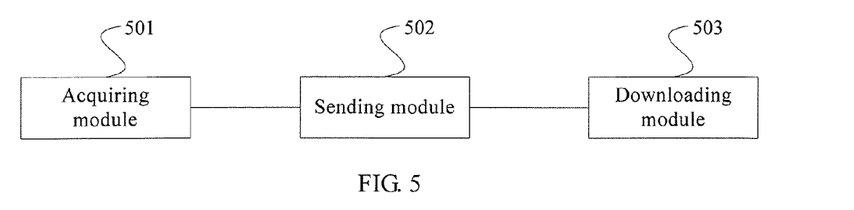
FIG. 5 is a schematic structural diagram of an AD processing apparatus according to Embodiment 1 of the present invention.

FIG. 5 is a schematic structural diagram of an AD processing apparatus according to Embodiment 1 of the present invention. The AD processing apparatus may be integrated into a terminal, and as shown in FIG. 5, the apparatus includes an acquiring module 501, a sending module 502, and a downloading module 503.

The acquiring module 501 is configured to acquire system information and/or current access network information of the terminal. The sending module 502 is configured to send, to a plugin server, an AD plugin request message that includes the system information and/or the current access network information, so that the plugin server acquires, according to the system information and/or the current access network information, AD plugin information that matches the terminal. The downloading module 503 is configured to receive the matching AD plugin information that is sent by the plugin server, and choose to download an AD plugin according to the AD plugin information.

Further, the foregoing downloading module 503 is specifically configured to determine an undownloaded target AD plugin according to the AD plugin information; and send, to the plugin server, a download request message for downloading the target AD plugin, so as to download the target AD plugin.

The foregoing acquiring module 501 is further configured to acquire updated current access network information of the terminal. The sending module 502 is further configured to send an AD request message to an AD server, so that the AD server delivers, to the terminal, an AD that matches the terminal, where the AD request message includes any one or combination of the following: an identifier of the AD plugin currently downloaded by the terminal, the system information, and the updated current access network information of the terminal.

It should be noted that the system information includes any one or combination of the following: central processing unit information of the terminal, type information of a supported network, screen size information, resolution information, memory information, and operating system version information.

The foregoing apparatus is configured to execute the foregoing method embodiments, implementation principles and technical effects of this embodiment are similar to those of the method embodiments, and details are not described herein again.

Figure 6:
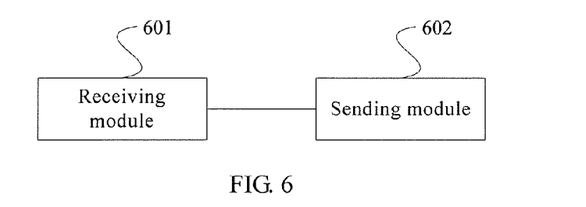
FIG. 6 is a schematic structural diagram of an AD processing apparatus according to Embodiment 2 of the present invention.

FIG. 6 is a schematic structural diagram of an AD processing apparatus according to Embodiment 2 of the present invention. The apparatus may be integrated into the foregoing plugin server, and as shown in FIG. 6, the apparatus includes a receiving module 601 and a sending module 602.

The receiving module 601 is configured to receive an AD plugin request message that is sent by a terminal and includes system information and/or current access network information of the terminal; and configured to acquire, according to the system information and/or the current access network information, an AD plugin list that matches the terminal; and send the AD plugin list to the terminal, so that the terminal chooses to download an AD plugin according to the AD plugin list.

Further, the foregoing receiving module 601 is further configured to receive a download request message that is sent by the terminal and is for downloading an AD plugin.

It should be noted that the system information includes any one or combination of the following: central processing unit information of the terminal, type information of a supported network, screen size information, resolution information, memory information, and operating system version information.

The foregoing apparatus is configured to execute the foregoing method embodiments, implementation principles and technical effects of this embodiment are similar to those of the method embodiments, and details are not described herein again.

Figure 7:
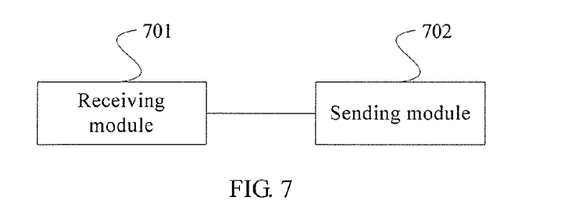
FIG. 7 is a schematic structural diagram of an AD processing apparatus according to Embodiment 3 of the present invention.

FIG. 7 is a schematic structural diagram of an AD processing apparatus according to Embodiment 3 of the present invention. The apparatus may be integrated into an AD server, and as shown in FIG. 7, the apparatus includes a receiving module 701 and a sending module 702.

The receiving module 701 is configured to receive an AD request message sent by a terminal, where the AD request message includes any one or combination of the following: an identifier of an AD plugin currently downloaded by the terminal, system information of a terminal, and current access network information of the terminal. The sending module 702 is configured to send, to the terminal according to the AD request message, an AD that matches the terminal.

It should be noted that the system information includes any one or combination of the following: central processing unit information of the terminal, type information of a supported network, screen size information, resolution information, memory information, and operating system version information.

Figure 8:
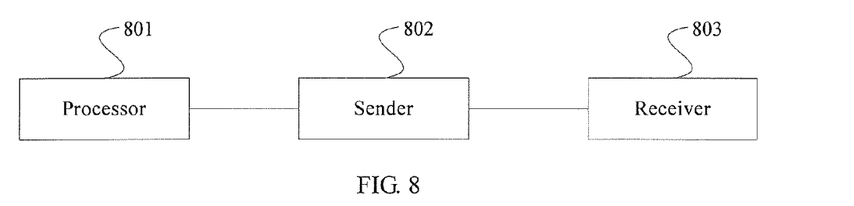
FIG. 8 is a schematic structural diagram of an AD processing apparatus according to Embodiment 4 of the present invention.

FIG. 8 is a schematic structural diagram of an AD processing apparatus according to Embodiment 4 of the present invention. The AD processing apparatus may be integrated into a terminal, and as shown in FIG. 8, the apparatus includes a processor 801, a sender 802, and a receiver 803.

The processor 801 is configured to acquire system information and/or current access network information of the terminal. The sender 802 is configured to send, to a plugin server, an AD plugin request message that includes the system information and/or the current access network information, so that the plugin server acquires, according to the system information and/or the current access network information, AD plugin information that matches the terminal. The receiver 803 is configured to receive the matching AD plugin information that is sent by the plugin server, and choose to download an AD plugin according to the AD plugin information.

Further, the receiver 803 is specifically configured to determine an undownloaded target AD plugin according to the AD plugin information; and instruct the sender 802 to send, to the plugin server, a download request message for downloading the target AD plugin, so as to download the target AD plugin.

The foregoing processor 801 is further configured to acquire updated current access network information of the terminal. The sender 802 is further configured to send an AD request message to an AD server, so that the AD server delivers, to the terminal, an AD that matches the terminal, where the AD request message includes any one or combination of the following: an identifier of the AD plugin currently downloaded by the terminal, the system information, and the updated current access network information of the terminal.

It should be noted that the system information includes any one or combination of the following: central processing unit information of the terminal, type information of a supported network, screen size information, resolution information, memory information, and operating system version information.

Figure 9:
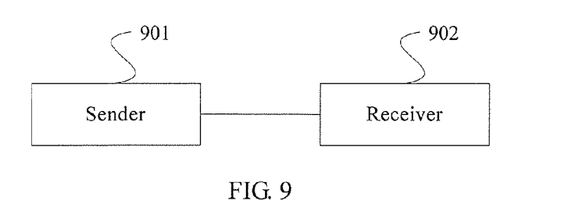
FIG. 9 is a schematic structural diagram of an AD processing apparatus according to Embodiment 5 of the present invention.

FIG. 9 is a schematic structural diagram of an AD processing apparatus according to Embodiment 5 of the present invention. The apparatus may be integrated into the foregoing plugin server, and as shown in FIG. 9, the apparatus includes a receiver 901 and a sender 902.

The receiving module 901 is configured to receive an AD plugin request message that is sent by a terminal and includes system information and/or current access network information of the terminal. The sender 902 is configured to acquire, according to the system information and/or the current access network information, an AD plugin list that matches the terminal; and send the AD plugin list to the terminal, so that the terminal chooses to download an AD plugin according to the AD plugin list.

Further, the foregoing receiver 901 is further configured to receive a download request message that is sent by the terminal and is for downloading an AD plugin.

The system information includes any one or combination of the following: central processing unit information of the terminal, type information of a supported network, screen size information, resolution information, memory information, and operating system version information.

Figure 10:
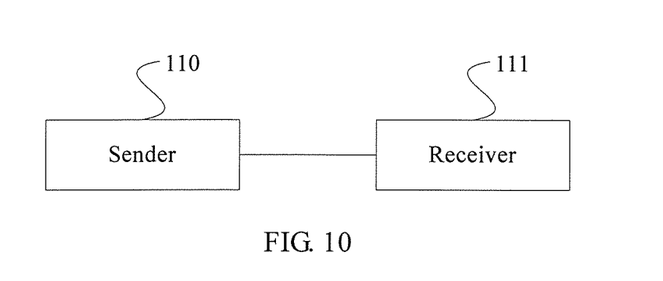
FIG. 10 is a schematic structural diagram of an AD processing apparatus according to Embodiment 6 of the present invention.

FIG. 10 is a schematic structural diagram of an AD processing apparatus according to Embodiment 6 of the present invention. The apparatus may be integrated into an AD server, and as shown in FIG. 10, the apparatus includes a receiver 110 and a sender 111.

The receiver 110 is configured to receive an AD request message sent by a terminal, where the AD request message includes any one or combination of the following: an identifier of an AD plugin currently downloaded by the terminal, system information of a terminal, and current access network information of the terminal. The sender 111 is configured to send, to the terminal according to the AD request message, an AD that matches the terminal.

The system information includes any one or combination of the following: central processing unit information of the terminal, type information of a supported network, screen size information, resolution information, memory information, and operating system version information.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An advertisement (AD) processing method, comprising:
    acquiring, by a terminal, system information or current access network information or both of the terminal;
    sending, by the terminal to a plugin server, an AD plugin request message that comprises the system information or the current access network information or both of the terminal, so that the plugin server acquires, according to the system information or the current access network information or both, AD plugin information that matches the terminal;
    receiving, by the terminal, the AD plugin information that is sent by the plugin server and matches the terminal; and
    choosing, by the terminal, to download an AD plugin according to the AD plugin information, including:
        determining an undownloaded target AD plugin according to the AD plugin information; and
        sending, to the plugin server, a download request message for downloading the target AD plugin, so as to download the target AD plugin.

2. The method according to claim 1, wherein after the terminal downloads the target AD plugin, the method further comprises:
    acquiring, by the terminal, updated current access network information of the terminal; and sending, by the terminal, an AD request message to an AD server, so that the AD server delivers, to the terminal, an AD that matches the terminal, wherein the AD request message comprises any one or combination of the following: an identifier of the AD plugin currently downloaded by the terminal, the system information, or the updated current access network information of the terminal.

3. The method according to claim 1, wherein the system information comprises any one or combination of the following: central processing unit information of the terminal, type information of a supported network, screen size information, resolution information, memory information, or operating system version information.

4. An advertisement (AD) processing apparatus, comprising:
  an acquiring module, configured to acquire system information or current access network information or both of a terminal;
  a sending module, configured to send, to a plugin server, an AD plugin request message that comprises the system information or the current access network information or both, so that the plugin server acquires, according to the system information or the current access network information or both, AD plugin information that matches the terminal; and
  a downloading module, configured to:
    receive the matching AD plugin information that is sent by the plugin server,
    choose to download an AD plugin according to the AD plugin information;
    determine an undownloaded target AD plugin according to the AD plugin information; and
    send, to the plugin server, a download request message for downloading the target AD plugin, so as to download the target AD plugin.

5. The apparatus according to claim 4, wherein:
  the acquiring module is further configured to acquire updated current access network information of the terminal; and
  the sending module is further configured to send an AD request message to an AD server, so that the AD server delivers, to the terminal, an AD that matches the terminal, wherein the AD request message comprises any one or combination of the following: an identifier of the AD plugin currently downloaded by the terminal, the system information, or the updated current access network information of the terminal.

6. The apparatus according to claim 4, wherein the system information comprises any one or combination of the following: central processing unit information of the terminal, type information of a supported network, screen size information, resolution information, memory information, or operating system version information.

7. An advertisement (AD) processing apparatus, comprising:
  a receiving module, configured to receive an AD plugin request message that is sent by a terminal and comprises system information or current access network information or both of the terminal; and
  a sending module, configured to:
    acquire, according to the system information or the current access network information or both, an AD plugin list that matches the terminal, and
    send the AD plugin list to the terminal, so that the terminal chooses to download an AD plugin according to the AD plugin list,
    wherein the terminal determines an undownloaded target AD plugin according to the AD plugin list, and sends, to the AD processing apparatus, a download request message for downloading the target AD plugin, so as to download the target AD plugin from the AD processing apparatus.

8. The apparatus according to claim 7, wherein the receiving module is further configured to receive the download request message.

9. The apparatus according to claim 8, wherein the system information comprises any one or combination of the following: central processing unit information of the terminal, type information of a supported network, screen size information, resolution information, memory information, or operating system version information.

* * * * *